United States Patent [19]
Fok

[11] Patent Number: 5,689,817
[45] Date of Patent: Nov. 18, 1997

[54] RF DUPLEXER BYPASSING TECHNIQUES FOR TRANSCEIVERS

[75] Inventor: Wilson Fok, Holmdel, N.J.

[73] Assignee: Lucent Technologies Inc., Murray Hill, N.J.

[21] Appl. No.: 592,823

[22] Filed: Jan. 26, 1996

[51] Int. Cl.[6] .................................................. H04B 1/44
[52] U.S. Cl. .............................. 455/79; 455/83; 333/101
[58] Field of Search .................. 455/78–83; 333/101, 333/103–104, 105

[56] References Cited

U.S. PATENT DOCUMENTS

| 4,914,714 | 4/1990 | Tamura | 455/78 |
| 4,982,442 | 1/1991 | Sarokhanian | 455/83 |

*Primary Examiner*—Andrew Faile
*Assistant Examiner*—Vincent F. Boccio
*Attorney, Agent, or Firm*—Steven R. Bartholomew

[57] ABSTRACT

Improved RF switching techniques operate in conjunction with an existing cellular telephone having an RF amplifier, an antenna, receiver circuitry, a duplexer, and a battery. The duplexer has a first port adapted for connection to the receiver circuitry, a second port adapted for connection to the RF amplifier, and a third port adapted for connection to the antenna. The improved RF switching techniques are characterized by a first switch, a second switch, and a battery of less than 6.0 volts. The first switch, coupled to the RF amplifier, connects the RF amplifier to any one of the antenna and the second port of the duplexer. A second switch, coupled to the antenna, connects the antenna to any one of the RF amplifier and the third port of the duplexer. During transmit-only operation, the first switch connects the RF amplifier to the antenna. During receive-only operation, and also during transmit-receive operation, the first switch connects the RF amplifier to the second port of the duplexer and the second switch connects the antenna to the third port of the duplexer.

10 Claims, 4 Drawing Sheets

RF DUPLEXER BYPASSING TECHNIQUES FOR TRANSCEIVERS

BACKGROUND OF THE INVENTION

1. Field of the Invention

The invention relates generally to radio transceivers, and more specifically to efficient RF switching techniques for use with such transceivers.

2. Background Art

FIG. 1 is a hardware block diagram of a portion of the RF circuitry of an existing transceiver designed for portable cellular telephone service. A frequency synthesizer 101, under the control of processor 103, generates an RF signal at a subharmonic of a desired frequency or, in some cases, at the desired frequency. If the synthesizer 101 generates a subharmonic, then one or more frequency multiplication stages 105 are used to generate a signal at the desired frequency. However, if the synthesizer 101 directly generates a signal at the desired frequency, no frequency multiplication stages 105 are required. The synthesizer 101 and the frequency multiplication stages 105 generate relatively low-powered RF signals which are amplified by a low-level amplifier 107. The output of low-level amplifier 107 is coupled to power amplifier 109.

The power amplifier 109 has a DC voltage supply input 112 which may be used to control the amount of RF output power produced by power amplifier 109, and to switch power amplifier 109 on and off. The low-level amplifier 107 also has a controlled DC voltage supply input 118 for controlling the amount of RF power produced by low-level amplifier 107, and/or a fixed voltage supply input 124 for providing low-level amplifier 107 with a relatively constant-voltage supply. DC voltage supply inputs 112 and 118 are coupled to a controlled voltage output line 116 of a voltage source 111. The voltage on controlled voltage output line 116 is determined by processor 103. Processor 103 selects an appropriate voltage for controlled output voltage line 116 such that a desired amount of RF power is outputted by power amplifier 109. Voltage source 111 has a fixed voltage output line 114 which is used to supply the frequency synthesizer 101 and the frequency multiplication stages 105 with DC power. Although the hardware configuration of FIG. 1 shows low-level amplifier 107 coupled to both a controlled voltage output line 116 and a fixed voltage output line 114, in some prior-art designs, the low-level amplifier 107 is coupled only to the fixed voltage output line 114, or only to the controlled voltage output line 116.

The RF output of power amplifier 109 is fed to a first port 115 of a 24-dB directional coupler 113 having a second port 117 and a third port 119. Substantially all of the RF power incident upon the first port 115 is coupled to the second port 117, and substantially all of the RF power incident upon the second port 117 is coupled to the first port 115. However, a small portion of the RF power traveling from the first port 115 to the second port 117, and a small portion of the RF power traveling from the second port 117 to the first port 115, is sampled by the third port 119. The power at the third port 119 is 24 dB less than the power incident upon the first port 115 and/or the second port 117. Therefore, third port 119 may be conceptualized as a sampling port. A 50-ohm load resistor 120 may be connected in series between one terminal of the third port 119 and ground.

The second port 117 is coupled to a transmit port 121 of a duplexer filter 123. The duplexer filter 123 has a receive port 125 which is coupled to receiver circuitry of the cellular telephone including, for example, low-noise amplifier 127.

In addition to the receive port 125, the duplexer filter 123 has an antenna port 129 which is coupled to an antenna 131 of the cellular telephone. The duplexer filter 123 enables antenna 131 to function as both a transmitting antenna and a receiving antenna while, at the same time, isolating low-noise amplifier 127 from power amplifier 109.

RF signals at the third port 119 of directional coupler 113 are coupled to a signal sampling RF amplifier 133 where these signals are amplified. The amplified signals are fed to a signal detector 135 which converts the signal to a feedback DC voltage 137 proportional to the strength of the RF signal at the output of signal sampling amplifier 133. In this manner, signal sampling RF amplifier 133 and signal detector 135 detect the relative level of RF signals traveling to and from the first and second ports 115, 117, respectively, of directional coupler 113. The feedback DC voltage 137 generated by signal detector 135 is fed to processor 103 which uses this information to determine the power output currently being produced by the power amplifier 109. The processor 103 controls the DC voltage on the controlled voltage output line 116 used by the low-level amplifier and/or the power amplifier 109, such that an RF signal of the desired power level is produced at the output of power amplifier 109.

In cellular telephone systems, the RF output power of power amplifier 109 may be controlled by processor 103. In this manner, a given cellular telephone will use a power level sufficient to provide communications of reasonable quality, while at the same time, avoiding interference to other cellular telephones. The processor controls the RF output power of power amplifier 109 by using the feedback DC voltage 137 generated by detector 135.

FIG. 2A is a graph showing amplifier linearity for power amplifier 109 when this amplifier is used in the circuit configuration of FIG. 1 with a 6.0-volt battery for voltage source 111. FIG. 2B is a graph showing amplifier linearity for power amplifier 109 when this amplifier is used in the circuit configuration of FIG. 1 with a 4.8-volt battery for voltage source 111. In the present context, the term "linearity" is defined as the extent to which there is a linear relationship between the RF input signal and the RF output signal of power amplifier 109.

One technique for measuring amplifier linearity is to test for third-order intermodulation products. Power amplifier 109 is provided with two input test signals that are closely-spaced in frequency, and of substantially equal amplitudes. In the example of FIGS. 2A and 2B, a first input test signal is at a frequency of 835.000 MHz, and a second input test signal is at a frequency of (835.000 MHz+30 Khz), or 835.030 Mhz. The plots of FIGS. 2A and 2B examine the RF output of power amplifier 109. If power amplifier 109 were perfectly linear, the output would only include a higher-amplitude version of the first input test signal at 835.000 Mhz, and a higher-amplitude version of the second input test signal at 835.030 Mhz. However, all real-world RF amplifiers exhibit some nonlinearity which appears at the output of power amplifier 109 in the form of sum and difference products, referred to as intermodulation products.

In the context of the present example, the sum and difference products of interest, known as the third-order products, are at the frequencies of (835.000 Mhz−30 KHz) or 834.970 Mhz, and (835.030 Mhz+30 Khz) or 835.060 Mhz. The amplitudes of these third-order products are compared with the amplitude of the amplified 835.000 Mhz test signal at the output of power amplifier 109. (Note that it is alternatively possible to compare the amplitudes of the third-order products with the amplitude of the amplified 835.030 Mhz test signal at the output of power amplifier 109, or to compare the amplitudes of the third-order products with the average amplitude of the amplified 835.000 Mhz and 835.030 Mhz signals.) The linearity of power amplifier 109 is directly proportional to the difference in amplitude between the amplified 835.000 Mhz test signal at the output of power amplifier 109 and the amplitude of the third-order products at the output of power amplifier 109.

In the context of cellular telephony, an acceptable level of amplifier linearity is provided when the third-order intermodulation products are about 28 dB below the amplitude of the test signal at the output of power amplifier 109. With reference to FIG. 2A, the amplitude of the first test signal, at a frequency of 835.000 MHz, is 28.0 dBm at the output of power amplifier 109. The second test signal, at a frequency of 835.030 Mhz, also has an amplitude of 28.0 dBm. The third-order intermodulation product at 835.060 MHz is 28 dB below each of these 28.0-dBm signals. If one or both of the 28.0 dBm signals is defined as the carrier, the third-order intermodulation product at 835.060 MHz is 28 dB below the carrier, or at −28 dBc. The intermodulation product at 834.070 MHz is also at −28 dBc. Therefore, with reference to FIG. 2A, the prior art configuration of FIG. 1 provides reasonable amplifier linearity when voltage source 111 is 6.0 Volts.

FIG. 2B examines amplifier linearity for the circuit configuration of FIG. 1 when voltage source 111 is 4.8 volts. Although the third-order intermodulation products are at an acceptable −28 dBc, notice that the test signals at the output of power amplifier are no longer +28.0 dBm, but have dropped by about 2 dB to +26 dBm. This lower output power is the result of using a 4.8-volt supply for voltage source 111 (FIG. 2B) instead of a 6.0-volt source (FIG. 2A). Note that the two-26-dBm output signals of FIG. 2B effectively correspond to a single output signal having an amplitude of 29 dBm.

In practice, power amplifier 109 is fed with a single input signal, and not with first and second test signals. Therefore, under normal operating conditions, the output of power amplifier 109 will include one output signal and not the signals shown in FIGS. 2A and 2B. Note that, as concerns the demands placed on power amplifier 109, a single output signal of 29 dBm is the equivalent of two output signals each having amplitudes of 26 dBm.

As a practical matter, 29 dBm is the maximum RF power that can be obtained at the output of power amplifier 109 when using a lower-voltage supply of 4.8 volts for voltage source 111. Since duplexer filter 123 of FIG. 1 attenuates this 29 dBm of power by about 3 dB, only about 26 dBm of power reaches antenna 131. Unfortunately, 26 dBm is an insufficient amount of power for use in the operational environment of cellular telephony. The prior art configuration of FIG. 1 provides insufficient RF power when a voltage source 111 of 4.8 volts is used.

For the sake of convenience, it would be desirable to provide a portable cellular telephone weighing as little as possible and having relatively small physical dimensions. To this end, it would be highly desirable to eliminate one cell of the 6-volt DC battery supply of the cellular telephone, and power up the cellular telephone using, for example, a 4.8-volt battery. A cellular telephone using a 4.8-volt battery is considerably smaller and lighter that a cellular telephone using a conventional 6-volt battery.

SUMMARY OF THE INVENTION

Improved RF switching techniques operate in conjunction with a transceiver that includes an RF power amplifier, an antenna, receiver circuitry, a duplexer filter, and a DC voltage source. The duplexer filter has a first port adapted for connection to the receiver circuitry, a second port adapted for connection to the RF power amplifier, and a third port adapted for connection to the antenna.

The improved RF switching technique is characterized by a first switch, a second switch, and a DC voltage source of less than 6.0 volts. The first switch, coupled to the RF power amplifier, connects the RF power amplifier to any one of the antenna and the second port of the duplexer filter. A second switch, coupled to the antenna, connects the antenna to any one of the power amplifier and the third port of the duplexer filter. During transmit-only operation, the first switch connects the RF power amplifier to the antenna. During receive-only operation, and also during transmit-receive operation, the first switch connects the RF power amplifier to the second port of the duplexer filter and the second switch connects the antenna to the third port of the duplexer filter. For a given amount of RF power to be provided at the antenna, the first switch and the second switch allow the RF power output of the power amplifier to be reduced relative to prior-art designs. In this manner, the RF amplifier draws less current than prior art designs, resulting in less heat generation and longer operating time.

DETAILED DESCRIPTION

Figure 3:
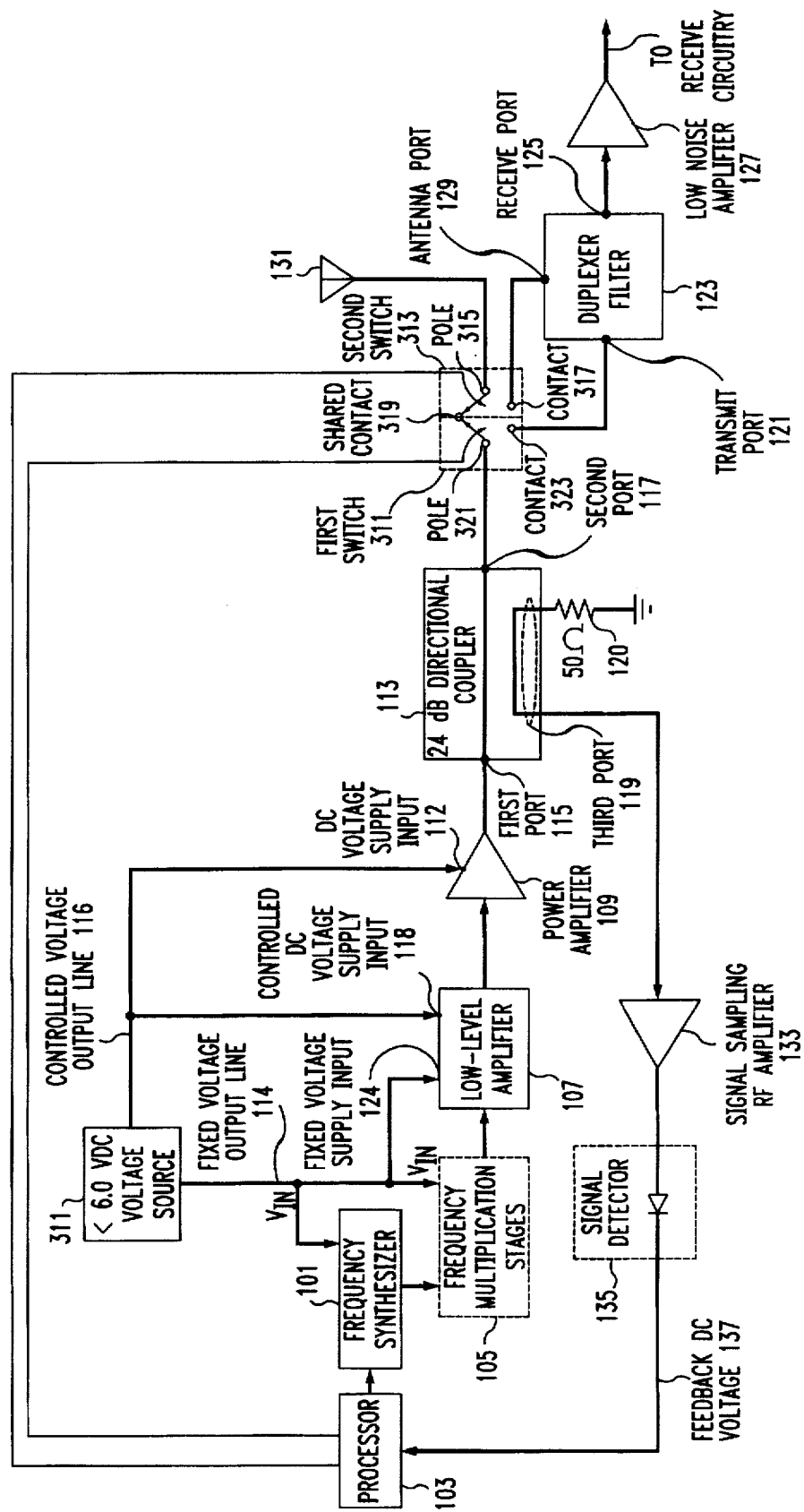
FIG. 3 is a block diagram showing a hardware configuration for an exemplary transceiver designed in accordance with a first embodiment disclosed herein.

FIG. 3 is a block diagram showing a hardware configuration for a transceiver designed in accordance with a first embodiment disclosed herein. The transceiver may, but need not, represent the transceiver of a portable cellular telephone. The transceiver utilizes frequency synthesizer 101, processor 103, optional frequency multiplication stages 105, low-level amplifier 107, power amplifier 109, 24-dB directional coupler 113, duplexer filter 123, low-noise amplifier 127, antenna 131, signal sampling RF amplifier 133, and signal detector 135. The structure and functioning of the aforementioned components is as was previously described in the context of FIG. 1.

Figure 1:
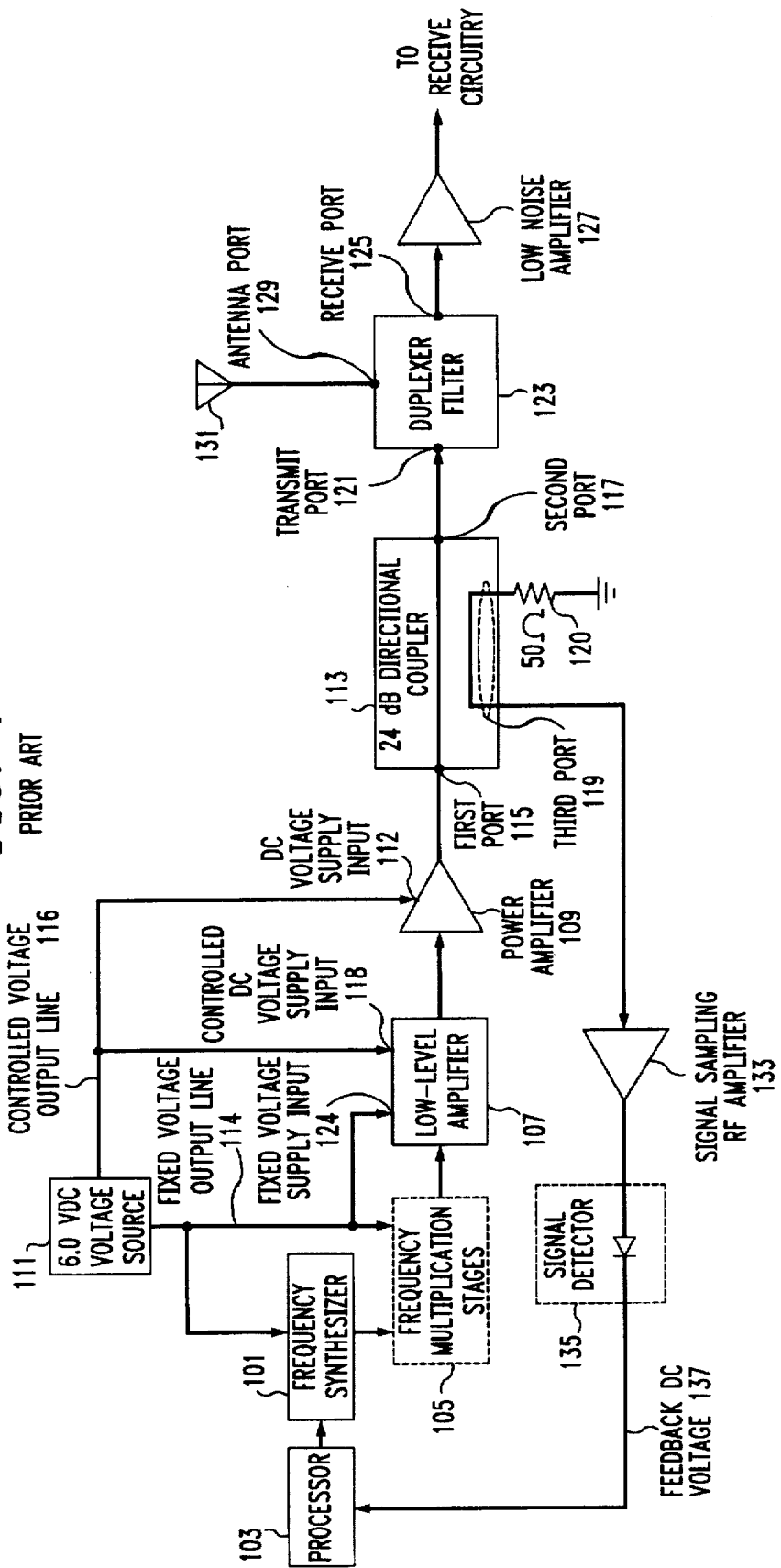
FIG. 1 is a block diagram showing the hardware configuration of a prior-art transceiver designed for portable cellular telephone service.

The configuration of FIG. 3 differs from that of FIG. 1 in that a first switch 311 and a second switch 313 are employed in FIG. 3 but not in FIG. 1. The first switch 311 has a pole 321 that is brought into contact with any one of a shared contact 319 and contact 323. The second switch 313 has a pole 315 that is brought into contact with any one of shared contact 319 and contact 317. Note that shared contact 319 is shared among first switch 311 and second switch 313.

Whereas the antenna 131 of FIG. 1 is connected directly to antenna port 129 of the duplexer 123, the antenna 131 of FIG. 3 is connected to the pole 315 of second switch 313. Moreover, whereas the second port 117 of the 24-dB directional coupler 113 in FIG. 1 is connected directly to the transmit port 121 of the duplexer filter, the second port 117 of the 24-dB directional coupler 113 of FIG. 3 is connected to the pole 321 of first switch 311. The antenna port 129 of FIG. 3 is connected to contact 317 of second switch 313, and the transmit port 121 of FIG. 3 is connected to contact 323 of first switch 311. Additionally, note that the voltage source 311 of FIG. 3 is less than 6.0 volts, whereas the voltage source 111 of FIG. 1 is 6.0 volts.

When the transceiver of FIG. 3 is to be used in transmit-only mode, such that frequency synthesizer 101, frequency multiplication stages 105, low-level amplifier 107, and power amplifier 109 are all activated, but receive circuitry including low-level amplifier 127 need not be activated, the processor 103 places the first switch 311 into a first switching position and the second switch 313 into a first switching position. Pursuant to the first switching position of the first switch 311, pole 321 is brought into RF coupling with shared contact 319, and pole 321 is not substantially RF-coupled to contact 323. According to the first switching position of the second switch 313, pole 315 is brought into RF coupling with shared contact 319, and pole 315 is not substantially RF-coupled to contact 317.

If the transceiver of FIG. 3 is to be used in a receive-only mode and/or in a transmit-receive mode, such that frequency synthesizer 101, frequency multiplication stages 105, low-level amplifier 107, and power amplifier 109 may or may not be activated, but receive circuitry including low-level amplifier 127 is activated, the processor 103 places the first switch 311 into a second switching position and the second switch 313 into a second switching position. Pursuant to the second switching position of the first switch 311, pole 321 is brought into RF coupling with contact 323, and pole 321 is not substantially RF-coupled to shared contact 319. According to the second switching position of the second switch 313, pole 315 is brought into RF coupling with contact 317, and pole 315 is not substantially RF-coupled to shared contact 319.

In transmit-only mode, RF energy from power amplifier 109 travels through 24-dB directional coupler 113, first switch 311, and second switch 313 to antenna 131. The 24-dB directional coupler 113 provides approximately 0.2 dB of RF attenuation, and the first switch 311 and second switch 313 each provide approximately 0.4 dB of RF attenuation. The total amount of attenuation between power amplifier 109 and antenna 131 is, therefore, (0.2 dB+0.4 dB+0.4 dB) or 1.0 dB. Therefore, if a given amount of power (i.e., X dB) must be supplied to antenna 131, then power amplifier 109 needs to provide an extra 1.0 dB of RF power (in addition to X dB) so as to overcome attenuation between power amplifier 109 and antenna 131. In other words, the power amplifier 109 needs to generate (X+1.0) dB of power to overcome the attenuation of circuit elements such as directional coupler 113, first switch 311, and second switch 313. If, for example, a transceiver for use in a cellular telephone is required to produce 27.8 dBm of RF power at antenna 131, then power amplifier 109 must be equipped to provide (27.8+1.0)=28.8 dBm of power.

Consider the requirements for the power amplifier 109 as employed in the prior-art circuit configuration of FIG. 1.

Assume, as in the case of the previous example, that a cellular telephone transceiver is required to produce 27.8 dBm of power at antenna 131. In transmit mode, RF energy from power amplifier 109 travels through 24-dB directional coupler 113, through duplexer filter 123, and to antenna 131. The 24-dB directional coupler 113 provides approximately 0.2 dB of RF attenuation, and the duplexer provides approximately 3.0 dB of RF attenuation. The total amount of attenuation between power amplifier 109 and antenna 131 is, therefore, (0.2 dB+3.0 dB) or 3.2 dB. If a given mount of power (i.e., X dB) must be supplied to antenna 131, then the power amplifier 109 used in the configuration of FIG. 1 needs to provide an extra 3.2 dB of RF power (in addition to X dB) so as to overcome attenuation between power amplifier 109 and antenna 131. In other words, the power amplifier 109 of FIG. 1 needs to generate (X+3.2) dB of power to overcome the attenuation of circuit elements such as directional coupler 113 and duplexer filter 123. To provide 27.8 dBm of RF power at antenna 131, then the power amplifier 109 of FIG. 1 must be equipped to provide (27.8+3.2)=31.0 dBm of power, as compared with 28.8 dBm of power for the configuration of FIG. 3.

In addition to overcoming the relatively high losses of the duplexer filter during transmit-only operations, the circuit configuration of FIG. 3 offers other advantages as well. Additional circuit gain is required to generate the 31.0 dBm of power required in the configuration of FIG. 1, and this additional circuit gain is not needed in the configuration of FIG. 3. Such additional circuit gain is achieved, for example, by increasing the voltage on the controlled voltage output line 116, by increasing the gain of low-level amplifier 107, and/or by increasing the RF drive to power amplifier 109.

Since the circuit configuration of FIG. 3 requires less gain than that of FIG. 1, it is possible to use a voltage source 311 in FIG. 3 that provides less voltage than voltage source 111 of FIG. 1. Actually, the most voltage-critical component in the circuit of FIG. 1 is the power amplifier 109. Voltage source 111 must be at least 6.0 volts in order to enable power amplifier 109 to produce the required 31.0 dBm of RF output power, thereby ensuring that 27.8 dBm is available at antenna 131. Even though the remaining components of FIG. 1 would function adequately if voltage source 111 was reduced to, say, 4.8 volts, the requirements of power amplifier 109 completely preclude use of a 4.8-volt voltage source 111 in the transceiver of FIG. 1.

The power amplifier 109 in the circuit configuration of FIG. 3 is only required to produce 28.8 dBm of output power to ensure 27.8 dBm at antenna 131. Power amplifier 109 can easily produce 28.8 dBm of power from a 4.8-volt voltage source 311, and a 6.0-volt source is not required. In this manner, one 1.2-volt cell can be eliminated from a conventional 6.0-volt battery pack and the remaining cells used as voltage source 311 (FIG. 3), thereby providing a lighter, smaller transceiver. Such a transceiver would be especially useful in portable applications such as, for example, cellular telephones, police radios, and/or PCS (personal communications services) devices.

Figure 2A:
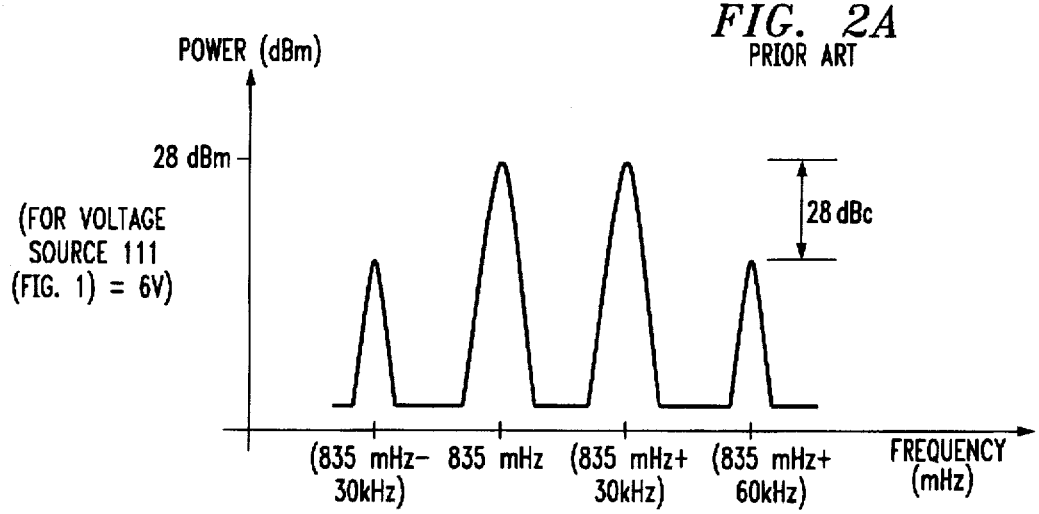
FIG. 2A is a graph showing amplifier linearity for an RF power amplifier used in the circuit configuration of FIG. 1 and supplied by a DC voltage source of 6.0 volts.
Figure 2B:
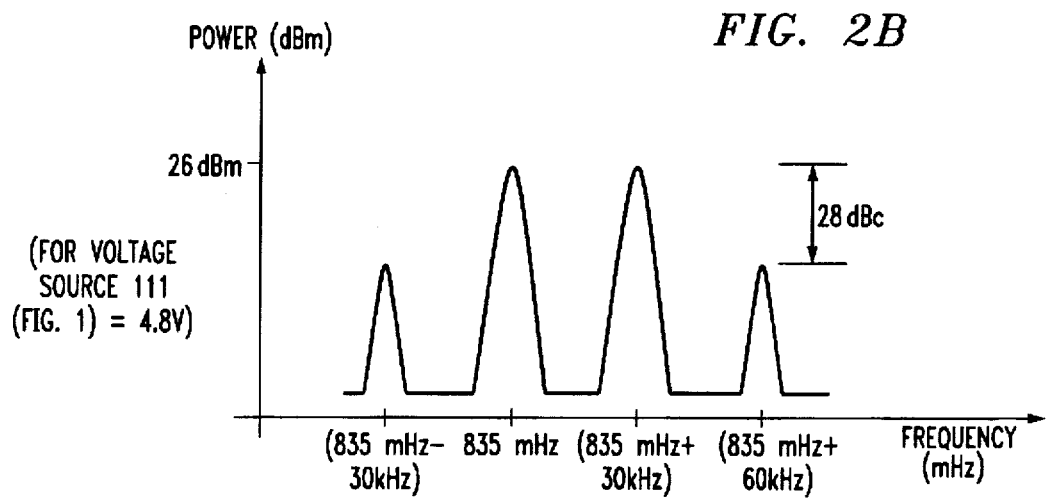
FIG. 2B is a graph showing amplifier linearity for an RF power amplifier used in the circuit configuration of FIG. 1 and supplied by a DC voltage source of 4.8 volts.

Using a voltage source 111 of 6.0 volts, the prior-art configuration of FIG. 1 is able to achieve acceptable amplifier linearity, and is also able to generate the required output power of 31.0 dBm (see FIG. 2A), even though the current consumption of the power amplifier 109 is somewhat higher than ideal. However, if voltage source 111 is reduced from 6.0 to 4.8 volts, the configuration of FIG. 1 will demonstrate inadequate amplifier linearity (see FIG. 2B), and will not be able to achieve the required output power of 31.0 dBm. Therefore, it is not possible to merely change the power supply voltage of FIG. 1 from 6.0 volts to 4.8 volts and expect acceptable circuit performance. Rather, additional changes must be made to the circuit of FIG. 1 if acceptable performance is to be obtained in the areas of amplifier linearity and power output.

The circuit configuration of FIG. 3 is advantageous because, as set forth above, it requires 2.2 dB less gain than the configuration of FIG. 1. This reduction in required gain enables use of a lower-voltage battery for voltage source 311, such as a 4.8-volt battery. However, the use of a lower voltage for voltage source 311 provides other advantages as well. The circuit of FIG. 1 may be conceptualized as requiring 2.2 dB more gain than the configuration of FIG. 3. However, irrespective of the manner in which the additional gain required in the circuit of FIG. 1, relative to FIG. 3, is achieved, the performance of power amplifier 109 in FIG. 1 may suffer. As the RF power output of power amplifier 109 is increased, the output of undesirable intermodulation products increases even more. For example, if the RF power output of power amplifier 109 (FIGS. 1 and 3) is reduced by only 3 dB, the amplitude of undesirable third-order intermodulation products decreases on the order of 6 dB, and the amplitude of fifth-order intermodulation products decreases by 10 dB! Therefore, the circuit configuration of FIG. 3, requiring 2.2 dB less amplifier power than the configuration of FIG. 1, can provide a significant improvement in intermodulation performance.

Figure 5:
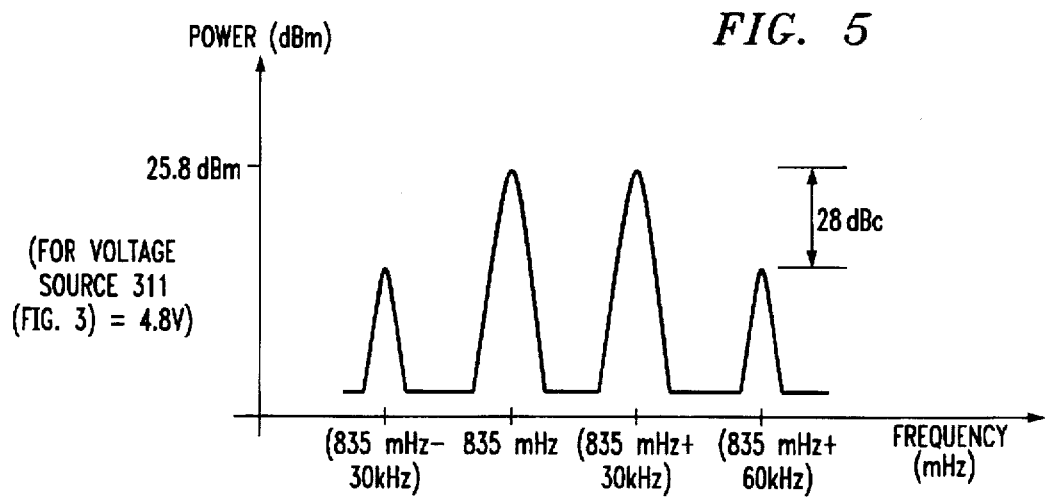
FIG. 5 is a graph showing amplifier linearity for an RF power amplifier used in the circuit configuration of FIG. 3, or used in the circuit configuration of FIG. 4, and supplied by a DC voltage source of 4.8 volts.
Figure 4:
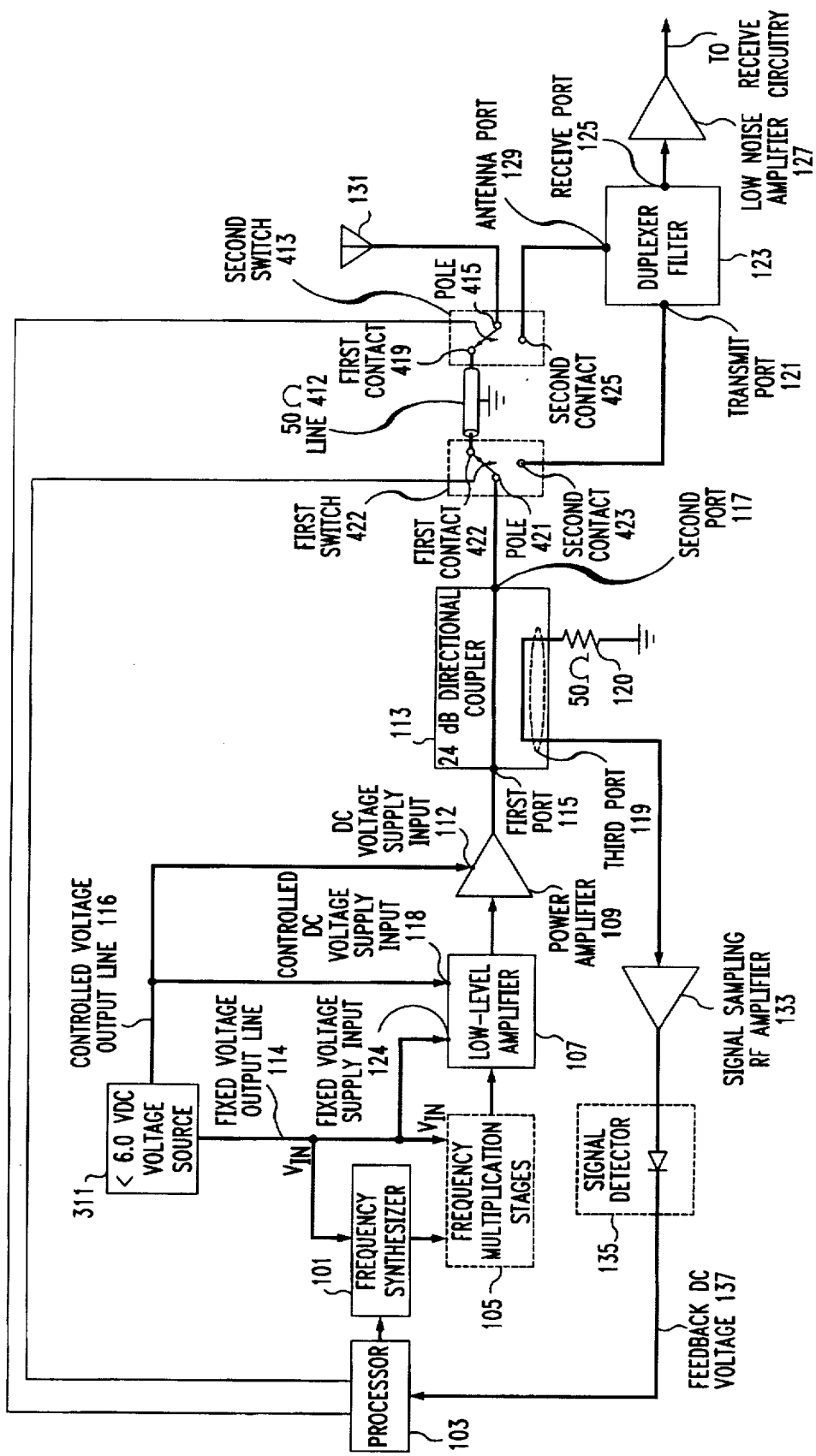
FIG. 4 is a block diagram showing a hardware configuration for an exemplary transceiver designed in accordance with a second embodiment disclosed herein.

Refer to FIG. 5, which shows amplifier linearity for an RF power amplifier used in the configuration of FIG. 3, or used in the configuration of FIG. 4, and supplied with a voltage source 311 of 4.8 volts DC. A first test signal is input to power amplifier 109 on a frequency of 835.000 MHz, and a second test signal is input to power amplifier 109 on a frequency of 835.030 MHz. The first and second test signals have substantially the same amplitude at the input of power amplifier 109. The plot of FIG. 5 shows the output of power amplifier 109. The first and second test signals each have an amplitude of 25.8 dBm, which corresponds to a single-frequency signal having an amplitude of 28.8 dBm. A single-frequency 28.8 dBm signal results in sufficient output power (27.8 dBm) at antenna 131 (FIGS. 3 and 4). The third-order intermodulation products are at −28 dBc, which signifies that power amplifier 109 is operating in a sufficiently linear manner.

FIG. 4 is a block diagram showing a hardware configuration for a transceiver designed in accordance with a second embodiment disclosed herein. As in the configuration of FIG. 3, the transceiver of FIG. 4 utilizes frequency synthesizer 101, processor 103, optional frequency multiplication stages 105, low-level amplifier 107, power amplifier 109, 24-dB directional coupler 113, duplexer filter 123, low-noise amplifier 127, antenna 131, signal sampling RF amplifier 133, and signal detector 135. The structure and functioning of the aforementioned components is as was previously described in the context of FIGS. 1 and 3.

The configuration of FIG. 4 differs from that of FIG. 3 in that the first switch 311 and the second switch 313 of FIG. 3 have a shared contact 119. Although FIG. 4 shows a fast switch 411 and a second switch 413, the first switch 411 and the second switch 413 do not have a shared contact. Rather, first switch 411 has a pole 421 that is brought into contact with any one of a first contact 422 and a second contact 423. The second switch 413 has a pole 415 that is brought into contact with any one of a first contact 419 and a second contact 425. The first contact 422 of first switch 411 is coupled to the first contact 419 of second switch 413.

The antenna 131 of FIG. 4 is connected to the pole 415 of second switch 413, and the second port 117 of the 24-dB directional coupler 113 is connected to the pole 421 of first switch 411. The antenna port 129 is connected to second contact 425 of second switch 413, and the transmit port 121 is connected to second contact 423 of first switch 411. The voltage source 311 of FIG. 4 is less than 6.0 volts, as was the case in FIG. 3, whereas the voltage source 111 of FIG. 1 is 6.0 volts.

When the transceiver of FIG. 4 is to be used in transmit-only mode, such that frequency synthesizer 101, frequency multiplication stages 105, low-level amplifier 107, and power amplifier 109 are all activated, but receive circuitry including low-level amplifier 127 need not be activated, the processor 103 places the first switch 411 into a first switching position and the second switch 413 into a first switching position. Pursuant to the first switching position of the first switch 411, pole 421 is brought into RF coupling with first contact 422, and pole 421 is not substantially RF-coupled to second contact 423. According to the first switching position of the second switch 413, pole 415 is brought into RF coupling with first contact 419, and pole 415 is not substantially RF-coupled to second contact 415.

If the transceiver of FIG. 4 is to be used in a receive-only mode and/or in a transmit-receive mode, such that frequency synthesizer 101, frequency multiplication stages 105, low-level amplifier 107, and power amplifier 109 may or may not be activated, but receive circuitry including low-level amplifier 127 is activated, the processor 103 places the first switch 411 into a second switching position and the second switch 413 into a second switching position. Pursuant to the second switching position of the first switch 411, pole 421 is brought into RF coupling with contact 423, and pole 421 is not substantially RF-coupled to first contact 422. According to the second switching position of the second switch 413, pole 415 is brought into RF coupling with second contact 425, and pole 415 is not substantially RF-coupled to first contact 419.

In transmit-only mode, RF energy from power amplifier 109 travels through 24-dB directional coupler 113, first switch 411, 50-ohm line 412, and second switch 413 to antenna 131. The 24-dB directional coupler 113 provides approximately 0.2 dB of RF attenuation, the first switch 411 and second switch 413 each provide approximately 0.4 dB of RF attenuation, and the 50-ohm line provides about 0.1 dB of attenuation. The total amount of attenuation between power amplifier 109 and antenna 131 is, therefore, (0.2 dB+0.4 dB+0.1 dB+0.4 dB) or 1.1 dB. Therefore, if a given amount of power (i.e., X dB) must be supplied to antenna 131, then power amplifier 109 needs to provide an extra 1.1 dB of RF power (in addition to X dB) so as to overcome attenuation between power amplifier 109 and antenna 131. In other words, the power amplifier 109 needs to generate (X+1.1) dB of power to overcome the attenuation of circuit elements such as directional coupler 113, first switch 411, 50-ohm line 412, and second switch 413. If, for example, a transceiver for use in a portable cellular telephone is required to produce 27.8 dBm of RF power at antenna 131, then power amplifier 109 must be equipped to provide (27.8+1.1)=28.9 dBm of output power. As previously discussed, in order to achieve 27.8 dBm of power at the antenna 131, the configuration of FIG. 1 requires 31.0 dBm of RF power at the output of power amplifier 109. Therefore, the configuration of FIG. 4 offers a 2.1-dB improvement over the configuration of FIG. 1.

In addition to overcoming the relatively high losses of the duplexer filter during transmit-only operations, the circuit configuration of FIG. 4 offers the other advantages already discussed in connection with FIG. 3. Moreover, the configurations of FIGS. 3 and 4 generate less heat during transmit, thereby resulting in cooler and more reliable operation. The heatsinking requirements of the FIG. 3 and 4 circuits may be reduced relative to that of FIG. 1, resulting in a lighter-weight transceiver. Such a transceiver is advantageously employed in portable applications, such as in cellular telephones, police radios, and/or personal communications systems (PCS) devices.

The circuits of FIGS. 3 and 4 perform well in the context of time division multiple access (TDMA) cellular systems. Pursuant to the TDMA standard known to those skilled in the art as IS-54, a cellular telephone is required to transmit, but not receive, during a portion of the time slot assigned to that cellular telephone. During this transmit-only time slot, the first switches (311, 411) and the second switches (313, 413) of FIGS. 3 and 4, respectively, are placed into the first position, providing the advantages set forth above. When the cellular telephone is required to receive only, or to receive and transmit, the switches 311, 313, 411, and 413 are placed into the second position.

Switches 311, 313, 411, and 413 are described as having poles and contacts for purposes of illustration. Note that the described poles and contacts may, but need not, be the actual physical poles and contacts of typical mechanical switches. For example, PIN diodes, hot-carrier diodes, and/or RF switching transistors may actually be used to implement any of the switches 311, 313, 411, and 413 shown in FIGS. 3 and 4. Irrespective of the actual structure used to implement switches 311, 313, 411 and 413, the switches should be designed to have relatively low insertion loss. It is not difficult to fabricate conventional mechanical switches for this purpose having insertion losses at 900 MHz on the order of 0.4 dB.

The invention claimed is:

1. An RF switching apparatus for use with a transceiver that includes an RF power amplifier, an antenna, receiver circuitry, a duplexer filter, and a DC voltage source;

the duplexer filter having a first port adapted for connection to the receiver circuitry, a second port adapted for connection to the RF power amplifier, and a third port adapted for connection to the antenna;

WHEREIN THE RF SWITCHING APPARATUS IS CHARACTERIZED BY:

(a) a first switch for coupling the RF power amplifier to any one of a second switch and the second port of the duplexer filter, and (b) said second switch for coupling the antenna to any one of the first switch and the third port of the duplexer filter.

2. The RF switching apparatus as set forth in claim 1 further characterized by said DC voltage source having a voltage of less than 6.0 volts.

3. The RF switching apparatus as set forth in claim 1 further characterized by the first switch, during transceiver transmit-only operation, connecting the RF power amplifier to the second switch; and the second switch, during transceiver transmit-only operation, connecting the first switch to the antenna.

4. The RF switching apparatus as set forth in claim 1 further characterized by the first switch, during transceiver receive-only operation, and also during transceiver transmit-receive operation, connecting the RF power amplifier to the second port of the duplexer filter; and the second switch, during said transceiver receive-only operation and also during said transceiver transmit-receive operation, connecting the antenna to the third port of the duplexer filter.

5. An RF switching method for use with a transceiver that includes an RF power amplifier, an antenna, receiver circuitry, a duplexer filter, and a DC voltage source;

the duplexer filter having a first port adapted for connection to the receiver circuitry, a second port adapted for connection to the RF power amplifier, and a third port adapted for connection to the antenna;

WHEREIN THE RF SWITCHING METHOD IS CHARACTERIZED BY THE STEPS OF:

(a) providing a first switch for coupling the RF power amplifier to any one of a second switch and the second port of the duplexer filter, and (b) providing said second switch for coupling the antenna to any one of the first switch and the third port of the duplexer filter.

6. The RF switching method as set forth in claim 5 further characterized by the step of providing said DC voltage source having a voltage of less than 6.0 volts.

7. The RF switching method as set forth in claim 5 further characterized by the step of the first switch, during transceiver transmit-only operation, connecting the RF power amplifier to the second switch.

8. The RF switching method as set forth in claim 5 further characterized by the step of the second switch, during transceiver transmits only operation, connecting the first switch to the antenna.

9. The RF switching method as set forth in claim 5 further characterized by the steps of:

(c) the first switch, during transceiver transmit-only operation, connecting the RF power amplifier to the second switch; and (d) the second switch, during transceiver transmit-only operation, connecting the first switch to the antenna.

10. The RF switching method as set forth in claim 5 further characterized by the steps of:

(e) the first switch, during transceiver receive-only operation, and also during transceiver transmit-receive operation, connecting the RF power amplifier to the second port of the duplexer filter; and (f) the second switch, during said transceiver receive-only operation and also during said transceiver transmit-receive operation, connecting the antenna to the third port of the duplexer filter.

\* \* \* \* \*